United States Patent [19]
Peterson

[11] 4,159,854
[45] Jul. 3, 1979

[54] BRAKE SYSTEM WITH PILOT ACTUATION

[75] Inventor: Wayne A. Peterson, Washington, Ill.

[73] Assignee: Caterpillar Tractor Co., Peoria, Ill.

[21] Appl. No.: 903,462

[22] Filed: May 8, 1978

[51] Int. Cl.² .............................................. B60T 8/26
[52] U.S. Cl. .................................... 303/6 M; 60/562; 137/636
[58] Field of Search ................. 60/548, 562, 581, 586; 137/594, 597, 636, 637, 637.2; 303/6 A, 6 C, 6 M, 9, 57, 63

[56] References Cited
U.S. PATENT DOCUMENTS

| | | | |
|---|---|---|---|
| 3,210,941 | 1/1965 | Stelzer | 60/562 |
| 3,423,136 | 1/1969 | Lohbauer | 303/54 |
| 3,653,405 | 4/1972 | Nelson | 137/594 |
| 3,695,730 | 10/1972 | Ayers | 303/6 C |
| 3,889,469 | 7/1975 | Cryder et al. | 60/562 |
| 3,957,315 | 5/1976 | Cummins et al. | 303/6 C |

*Primary Examiner*—Duane A. Reger
*Attorney, Agent, or Firm*—Phillips, Moore, Weissenberger, Lempio & Majestic

[57] ABSTRACT

A hydraulic brake system with pilot actuation for the braking of a vehicle is disclosed. The brake system includes a service brake valve, a park brake valve and a retard brake valve. The hydraulic brake system further includes an additional brake valve including two separate spools slidably disposed within a valve body, each being responsive to pilot pressure from the above-disclosed valves. The first of the spools in the additional brake valve communicates pilot pressure from a fluid pressure source to the rear brakes of the vehicle and from the rear brakes to a fluid pressure reservoir or sump. The second spool communicates fluid from the fluid pressure source to the front brakes and from the front brakes to the fluid pressure reservoir. The first spool of the additional brake valve is also independently responsive to pilot pressure from at least one of the above disclosed valves which responsiveness allows for a variance in braking force between the front and rear brakes.

33 Claims, 4 Drawing Figures

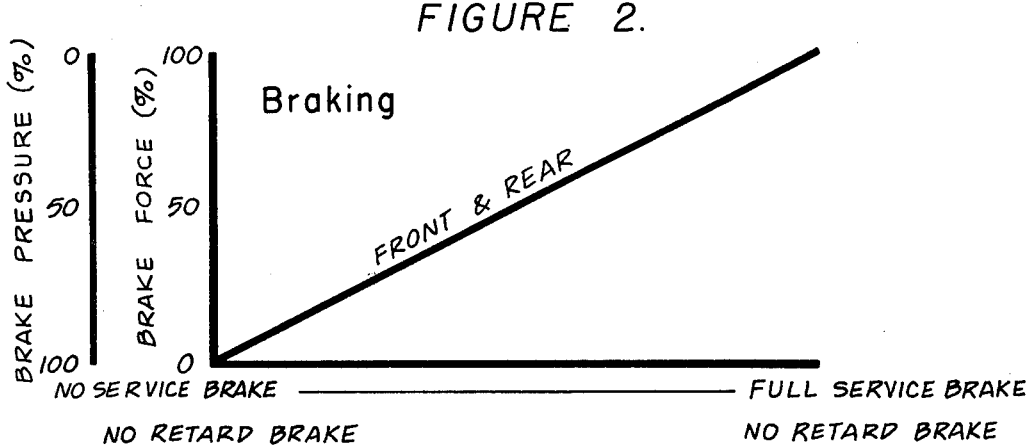
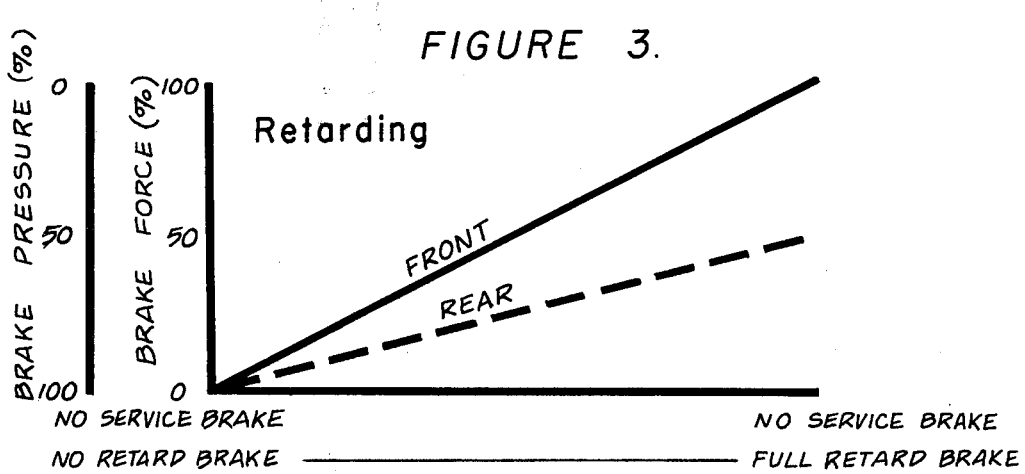
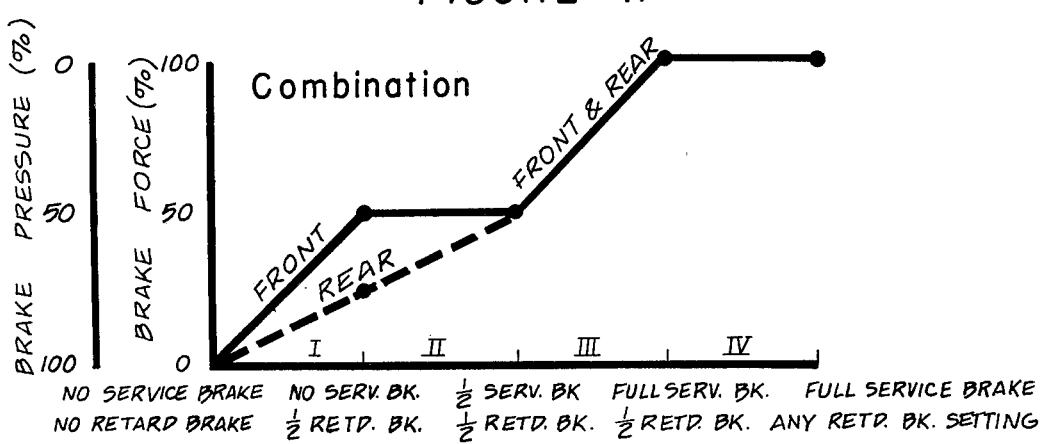

BRAKE SYSTEM WITH PILOT ACTUATION

BACKGROUND OF THE INVENTION

This invention relates to a brake system for a vehicle, and more particularly to a hydraulic brake system for applying selectively the same and different braking pressures to the front and rear brakes of the vehicle.

In a variety of vehicles, and especially in large earthmoving vehicles, or heavy material-carrying vehicles, such as, for example, tractor scrapers, there is always the need to provide adequate cooling to the brakes. Such cooling insures the continued operation of the brakes especially when said brakes are used to stop a fully loaded vehicle. Generally, a tractor scraper includes a front set of brakes associated with the front wheels of the tractor and a rear set of brakes associated with the rear wheels of the scraper. Cooling apparatus, operably associated with the engine means of the tractor, can be used to cool the front set of brakes. However, there is generally no cooling apparatus other than that designed into the tire and hub themselves, associated with the rear brakes of the scraper. This is due to the uneconomical expense of operably associating a cooling apparatus located in the scraper with the engine means located in the tractor. Further, any arrangement which did associate an engine means located in the tractor with the scraper cooling apparatus would require for example, universal pipe connectors or exposed flexible conduits, both of which are susceptable to breakage. A need for solving the cooling problem for a heavy material-carrying vehicle that is required to travel down long, steep grades, can easily be appreciated.

SUMMARY OF THE INVENTION

The present invention is directed to overcoming one or more of the problems as set forth above by providing for a brake system that reduces the braking pressure applied to the rear brakes during, for example, the negotiation of long, steep grades, while providing equivalent braking pressure to the front and rear brakes should full braking be required.

According to the present invention, a brake valve is disclosed which comprises a valve body, a first spool slidably disposed in a first bore defined by the valve body, a second spool slidably disposed in a second bore defined by the valve body, and positioning means for positioning the first spool, which positioning means is in communication with a portion of the first spool. The brake valve further includes a fluid charging port defined by the valve body in fluid communication with the first and second bores, and a fluid discharging port defined by the valve body and in fluid communication with the first and second bores. The brake valve further includes a first brake communication port defined by the valve body and in fluid communication with the first bore and a second brake communication port defined by the valve body and in fluid communication with the second bore. A first fluid pilot port is defined by the valve body and is in fluid communication with the positioning means, the positioning means interposed between the first spool and the first fluid pilot port. Further, the first bore includes a first end portion which is in fluid communication with a first end portion of the second bore, and the first spool communicates with the positioning means adjacent the first end portion of the first bore.

An aspect of the invention includes channel means defined by the positioning means for selectively providing communication between the first fluid pilot port and the first bore.

The above-disclosed brake valve is combined with a brake system for a vehicle, the vehicle having a first set of brakes and a second set of brakes. The brake system further includes an additional positioning means for positioning the first and second spools relative to the fluid charging and discharging ports and relative to the first and second brake communication ports respectively.

BRIEF DESCRIPTION OF THE DRAWINGS

FIGS. 2, 3 and 4 are graphs depicting the performance of the brake system of the invention.

DESCRIPTION OF THE PREFERRED EMBODIMENT

Figure 1:
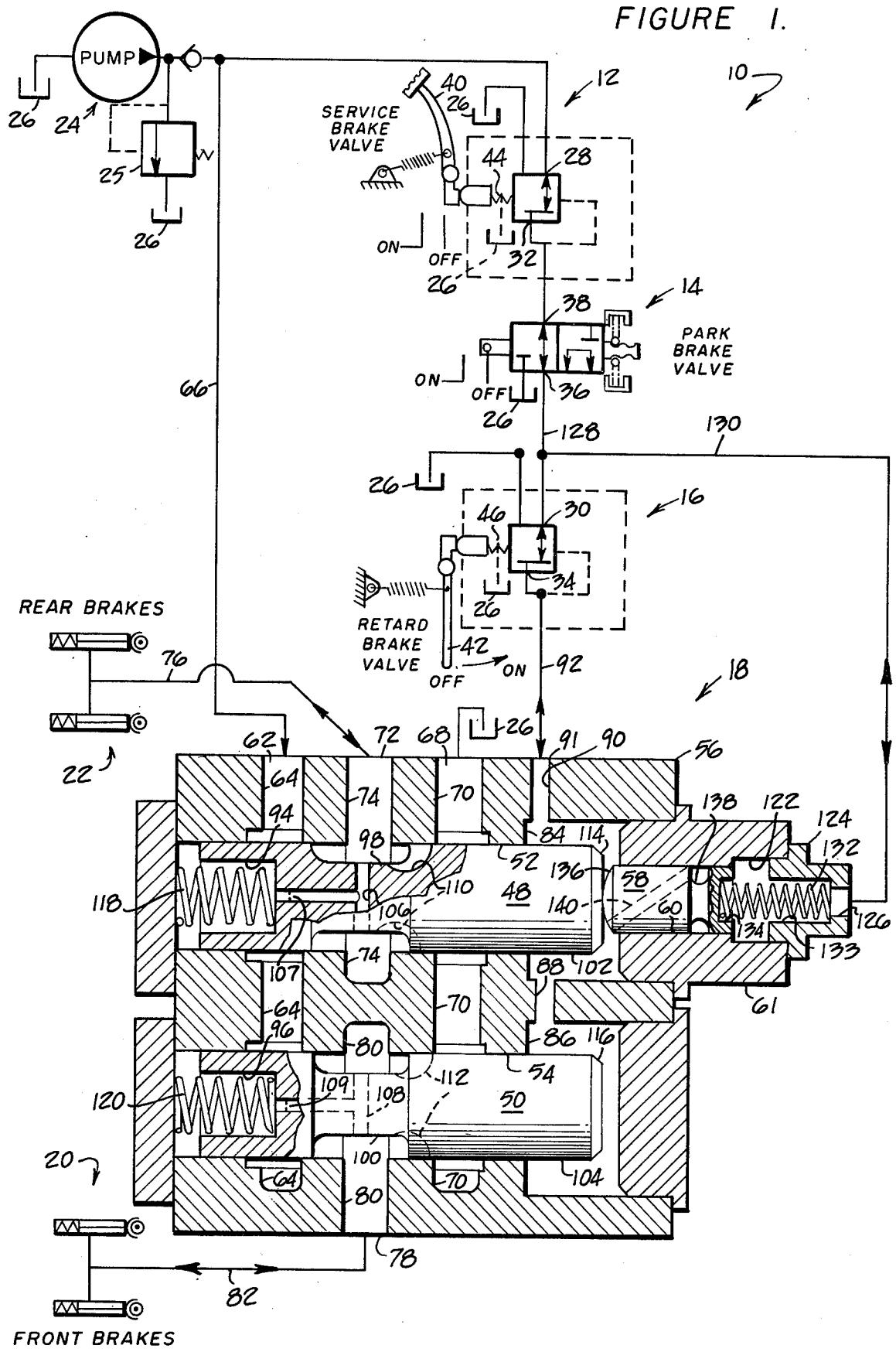
FIG. 1 is a partial schematic view of the brake system including a partially sectional, enlarged view of the brake valve of the invention.

With reference to FIG. 1, the hydraulic brake system for a vehicle is depicted and is generally denoted by reference numeral 10. Brake system 10 includes a service brake valve 12, enclosed with a broken line, a park brake valve 14 and a retard brake valve 16 enclosed with a broken line, all depicted schematically, and in series fluid communication.

Brake system 10 further includes a control valve 18 in fluid communication with a set of disc, spring-applied, pressure-released front brakes 20 and a set of disc, spring-applied, pressure-released rear brakes 22 of the vehicle. Further, a source of pressurized hydraulic fluid or pump 24 is depicted in FIG. 1 together with a relief valve 25 and a sump for hydraulic fluid, or tank, which is depicted as a plurality of individual sumps, each denoted 26.

In a preferred embodiment service brake valve 12 and retard brake valve 16 comprise infinitely variable pressure reducing valves, each having a fluid charging port 28 and 30 and a fluid discharging port 32 and 34, respectively. Charging ports 28 and 30 are in fluid communication with pump 24 and discharging port 36 of park brake valve 14, respectively, and discharging ports 32 and 34 are in fluid communication with charging port 38 of park brake valve 14 and control valve 18 respectively. Valves 12 and 16 include a foot lever 40 and a control lever 42, respectively, both spring biased to the "off" position. Valves 12 and 16 further include internal spring arrangement 44 and 46 respectively which bias valves 12 and 16, respectively, such that ports 28 and 32 of valve 12 are in fluid communication and ports 30 and 34 of valve 16 are in fluid communication. Valves 12 and 14 shunt increasingly larger amounts of fluid from discharge ports 32 and 34 to sump 26 as levers 40 and 42 are moved to an "on" position.

Park brake valve 14 includes a two position valve which provides fluid communication between charging port 38 and discharging port 36 in the "off" mode, and blocks charging port 38 and shunts discharging port 36 to sump 26 in the "on" mode.

Considering control valve 18, a first spool 48 and a second spool 50 are slidably disposed in a first bore 52 and a second bore 54 respectively, said bores 52, 54 being defined by valve body 56 of control valve 18. Control valve 18 further includes a third spool 58 slidably disposed through a third bore 60, which third bore 60 is defined by a plug 61 of valve body 56. As can be seen in FIG. 1, valve body 56 defines a fluid charging port 62 which is provided in fluid communication with first and second bores 52 and 54 by a charging passage 64 defined by valve body 56. Charging passageway 64, although shown segmented in FIG. 1, extends about first and second bores 52 and 54. A conduit 66 (depicted schematically) provides fluid communication between pump 24 and charging port 62.

Valve body 56 further defines a fluid discharging port 68, which is in fluid communication with sump 26, and a discharging passageway 70, which provides fluid communication between fluid discharging port 68 and first and second bores 52 and 54. Discharing passageway 70, although shown segmented in FIG. 1, extends about first and second bores 52 and 54.

Valve body 56 defines a rear brake fluid communication port 72 and a rear brake fluid passage 74 that provides fluid communication between port 72 and first bore 52. A conduit 76 (shown schematically) provides fluid communication between port 72 and rear brakes 22. Valve body 56 further defines a front brake fluid communication port 78 and a front brake fluid passage 80 that provides fluid communication between port 78 and second bore 54. A conduit 82 (shown schematically) provides fluid communication between front brakes 20 and port 78. As depicted in the embodiment of FIG. 1, passages 74 and 80 are opposed and interspaced between passages 64 and 70.

The first end portions 84 and 86 of bores 52 and 54, respectively, are enlarged and are placed in fluid communication by passageway 88. Further, a passageway 90 defined by valve body 56, a pilot port 91, and a conduit 92 (shown schematically) provides fluid communication between first end portion 84 of first bore 52 and discharge port 34 of retard brake valve 16. This provides first positioning means for positioning the spools 48 and 50 as will shortly become apparent.

As depicted in FIG. 1, first and second spools 48 and 50 are generally cylindrical and elongate, and include first generally bored-out end portions 94 and 96 respectively, central annular channels, or undercuts, 98 and 100, respectively, in fluid communication with bores 52 and 54, respectively, and cylindrical end portion 102 and 104, respectively, which end portions 102 and 104 extend into first and second enlarged end portions 84 and 86 of bores 52 and 54.

Spool 48 is designed such that central annular channel 98 selectively provides fluid communication between charging passage 64 and rear brake passage 74, and between rear brake passage 74 and discharging passage 70. Spool 50 is designed such that central annular channel 100 selectively provides fluid communication between charging passage 64 and front brake passage 80, and between front brake passage 80 and discharging passage 70.

Spools 48 and 50 further define T-shaped internal bore arrangements 106 and 108 respectively which provide fluid communication between annular channel 98 and bored-out end 94 and between annular channel 100 and bored-out end 96 respectively. Provided in T-shaped bore arrangements 106 and 108 are restrictive orifices 107 and 109 respectively, which orifices compensate for sudden changes in fluid pressure.

Spools 48 and 50 also define a first plurality of modulating slots 110 and a second plurality of modulating slots 112 respectively. Slots 110 and 112 are generally semicircular and provide fluid communication between the cylindrical surface of spool 48 adjacent cylindrical end portion 102 and annular channel 98, and between the cylindrical surface of spool 50 adjacent cylindrical end portion 104 of spool 50 and annular channel 100 respectively. Further, tip portions 114 and 116 of spools 48 and 50 are beveled, tip portion 114 of spool 48 being in intimate contact with third spool 58. The operation of slots 110 and 112 is discussed hereinbelow.

Nested in the bored-out end portions 94 and 96 are first and second coil springs 118 and 120, which bias spools 48 and 50 toward enlarged end portions 84 and 86 of bores 52 and 54 respectively. Thus spools 48 and 50 are normally biased to communicate brakes 20 and 22 to the sump 26 whereby brakes 20 and 22 are normally (non-pressurized) applied.

Considering third spool 58 and third bore 60, and as can be seen in FIG. 1, third bore 60 defines an enlarged end portion 122, adapted to receive a plug 124, which plug 124 has a bored-out end portion 133 in fluid communication with a fluid pilot port 126. Port 126 is provided in fluid communication with conduit 128, which connects discharging port 36 of park brake valve 14 to charging port 30 of retard brake valve 16, by a branch conduit 130. Nested in end portion 133 of plug 124, is a coil spring 132 which is received in bored-out end portion 134 of third spool 58 and which owing to a fixed length just urges an annular channel 138 (discussed below) out of fluid communication with enlarged end portion 122.

Spaced from bored-out end 134, third spool 58 defines the annular channel or undercut 138 which communicates with third bore 60. Third spool 58 also defines a sloping internal bore 140 (shown in broken lines) which provides communication between the dome-shaped distal end 136 and the annular channel 138 such that if spool 58 is urged toward plug 124 such that annular channel 138 communicates with enlarged end portion 122 of bore 60, fluid communication is provided between port 126 and the first end portion 84 of first bore 52. The operation of third spool 58 is discussed hereinbelow.

The operation of brake system 10 is as follows:

With service brake valve 12, park brake 14 and retard brake valve 16 in the "off" mode, hydraulic fluid at a substantially equal pressure is provided from pump 24 to fluid charging port 62 and to pilot port 91. Pressure at pilot port 91 is applied via first end portions 84, 86 to force spools 48, 50 leftwardly by overcoming springs 118, 120. From charging port 62, fluid can then flow through passage 64, to first and second bores 52, 54 and to annular channels 98, 100, then through T-shaped bore arrangements 106, 108 to end portions 94 and 96 so as to urge spools 48 and 50 rightwardly toward first end portions 84 and 86 of bores 52 and 54. From annular channels 98 and 100 fluid is also provided to rear brake port 72 and front brake port 78. As spools 48 and 50 slide toward end portions 84 and 86, spools 48 and 50 block charging passage 64 and urge modulating slots 110 and 112 and thereby annular channels 98 and 100 into fluid communication with discharging passage 70 and sump 26 so as to withdraw fluid from brake ports 72 and 78.

From pilot port 91, fluid is provided to end portions 84 and 86 of bores 52 and 54 so as to urge spools 48 and 50 in a reverse direction whereby end portions 102 and 104 of spools 48 and 50 block discharging passage 70.

It is noted that restrictive orifices 107 and 109, and modulating slots 110 and 112 modulate spools 48 and 50 such that a pre-selected range of fluid pressure is provided to brake passages 74 and 80.

It is further noted that as brakes 20 and 22 are spring-applied, pressure-release brakes, should fluid not be provided to brake ports 72 and 78 if, for example, the hydraulic lines break, or if the vehicle engine powering pump 24 dies, or if brake valve 12, 14 or 16 are applied (operation described hereinbelow), brakes 20 and 22 would immediately be applied, stopping the vehicle.

Considering valves 12, 14 and 16, as service brake valve 12 is applied, foot lever 40 is urged to the "on" mode, and the park brake valve 14 and retard brake valve 16 are maintained in the "off" mode, the compressive force on spring arrangement 44 is released and discharging port 32 is placed in increasingly greater fluid communication with sump 26, reducing the pressure to discharging port 32 in direct relationship to the position of foot lever 40. Consequently, the pressure to pilot ports 91 and 126 is reduced while the pressure to charging port 62 is maintained, and thus spools 48 and 50 are urged rightwardly toward bore first end portions 84 and 86 respectively. Thus brake ports 72 and 80 are placed in fluid communication with discharging port 68 and sump 26, reducing the pressure to brakes 20 and 22, which brakes are then applied in relationship to the position of foot lever 40. FIG. 2 depicts graphically the above-disclosed operation, showing that as the brake force on lever 40 is increased, the brake fluid pressure is decreased, increasing the spring pressure on brakes 20 and 22.

With service brake valve 12 and retard brake valve 16 in the "off" mode, two position park brake valve 14 can be moved from the "off" mode wherein pump 24 communicates with pilot port 91 and 126 to the "on" mode wherein sump 26 communicates with pilot port 91 and 126 reducing pressure to pilot port 91 and 126, and as discussed above with the resultant application of brakes 20 and 22. However, park brake valve 14 is not infinitely variable as are valves 12 and 14 and thus with valve 14 in the "on" position brakes 20 and 22 are fully applied.

With service brake valve 12 and park brake valve 14 in the "off" mode, retard brake valve 16 can be applied to reduce the speed of the vehicle as it descends a long slope. As with service brake valve 12 retard brake valve 16 is infinitely variable from a fully "off" mode to a fully "on" mode. As can be seen in FIG. 1, as retard brake valve 16 is applied, pilot port 91 is placed in fluid communication with sump 26, reducing the fluid pressure in end portions 84 and 86 of bores 52 and 54 below the fluid pressure provided to charging port 62. Thus, spools 48 and 50 are urged toward end portions 84 and 86, venting brake parts 72 and 78 to sump 26. However, fluid pilot port 126 is in fluid communication with pump 24 and is maintained at substantially the same fluid pressure as charging port 62. Consequently, third spool 58 is urged against and prohibits first spool 48 from sliding into enlarged end portion 84 as far as second spool 50 slides into enlarged end portions 86. Thus, rear brake port 72 is provided in more obstructed fluid communication with discharging port 68 than front brake port 80 is with discharging port 68. Accordingly, the brake fluid pressure provided to rear brakes 22 is greater than the brake fluid pressure applied to front brakes 20. Consequently, spring-applied front brakes 20 absorb more of the energy generally as the vehicle is slowed, which front brakes 20 are provided with cooling means (not shown) which have a greater cooling capacity (dictated by design criteria discussed in the Background of the Invention) than the cooling means (not shown) of rear brakes 22. It is noted that as the cross-sectional area of third spool 58 is less than the cross-sectional area of first spool 48, with substantially equivalent fluid pressure provided to charging port 62 and pilot port 126, first spool 48 will urge the third spool 58 toward pilot port 126 with a force proportional to the difference in cross-sectional area of spools 48 and 58.

FIG. 3 shows that the front brakes 20 receive less brake fluid pressure than rear brakes 22 as retard brake valve 16 is incremented from the "off" mode (no retard) to the "on" mode (full retard).

Finally, brake valve 12 can override retard brake valve 16 should the need arise to either more greatly decrease the velocity of the vehicle, or to bringing the vehicle to a full immediate stop. As can be seen in FIG. 1, branch conduit 130 and thus pilot port 126 are unaffected by retard brake valve 16. Thus, no matter to what degree pilot port 91 is placed in communication with sump 26, pilot port 126 can be placed in partial or full communication with sump 26 through service brake valve 12. With pilot port 126 in fluid communication with sump 26, the fluid pressure thereto is reduced, allowing first spool 48 to urge third spool 58 toward the enlarged end portion 122 of third bore 60, (Section II of FIG. 4) second spool 50 remaining stationary. Thus, the fluid brake pressure to rear brakes 22 is reduced as that to front brakes 20 is maintained at a constant rate. (Note Section I of FIG. 4 is substantially identical to FIG. 3).

When annular channel 138 of third spool 58 slides into fluid communication with enlarged bore and portion 122 of third bore 60, fluid communication is provided between enlarged bore and portions 84 and 86, and pilot port 126, and thus to sump 26 through sloping internal bore 140. Consequently, the fluid pressure in enlarged bore end portions 84 and 86 is immediately decreased with the resultant simultaneous sliding of spools 48 and 50 (which at this point are similarly positioned with respect to bores 52 and 54) further into end portions 84 and 86, and the resultant more unobstructed fluid communication of brake ports 74 and 78 with discharging port 68, and the resultant simultaneous increase in spring pressure applied to brakes 20 and 22. (Section III, FIG. 4). Section IV of FIG. 4 depicts the resultant brake pressure with service brake valve 14 in the full "on" mode.

It is noted that were sloping bore 140 not provided in third spool 58, retard brake valve 16 would also have to be positioned in the "on" mode to relieve the pressure in bore end portions 84 and 86, to effect immediate vehicle braking.

The embodiments of the invention in which an exclusive property or privilege is claimed are defined as follows:

1. A brake system for a vehicle, having a first set of brakes and a second set of brakes and a source of pressurized fluid and a sump, comprising:
   a valve body;
   a first spool slidingly disposed in a first bore defined by the valve body;
   a second spool slidingly disposed in a second bore defined by the valve body;
   a first communication means for placing the source of fluid in fluid communication with the first and second bores;

a second communication means for placing the sump in fluid communication with the first and second bores;

a third communication means for placing the first bore in fluid communication with the first set of brakes;

a fourth communication means for placing the second bore in fluid communication with the second set of brakes;

first positioning means for positioning the first spool in the first bore to provide communication selectively between the source fluid and the first set of brakes and between the sump and the first set of brakes, and for positioning the second spool in the second bore to provide communication selectively between the source of fluid and the second set of brakes and between the sump and the second set of brakes;

second positioning means for positioning the first spool relative to the second spool for providing a variance in braking force between the first and the second set of brakes.

2. A brake system in accordance with the claim 1 wherein the second positioning means includes a third spool slidably disposed in a third bore defined by the valve body, and wherein the third spool is communicable with the first spool.

3. A brake system in accordance with claim 2 wherein the first spool and the third spool have substantially colinear longitudinal axes, and a first end portion of the first spool is communicable with a first end portion of the third spool.

4. A brake system in accordance with claim 2 including fifth communication means for placing a first end portion of the first bore in fluid communication with a first end portion of the second bore, and wherein a first end portion of the first spool is slidably disposed in the first end portion of the first bore and a first end portion of the second spool is slidably disposed in the first end portion of the second bore.

5. A brake system in accordance with claim 4 wherein the first positioning means is selectively, in varying degrees, in fluid communication with the source and the sump and wherin the second positioning means is in fluid communication with the first positioning means and wherein the third spool includes a first end portion which communicates with the first end portion of the first spool and a second end portion located distally from the first end portion and wherein the first end portion of the third spool is slidably disposed in a first end portion of the third bore and the second portion of the third spool is slidingly disposed in the second end portion of the third bore, wherein the third spool includes an annular channel adjacent the second end portion thereof, which communicates with the third bore, and wherein the valve body defines a cavity in fluid communication with the second end portion of the third bore and in fluid communication with the first positioning means, and wherein the third spool further defines a substantially transverse channel for placing the first end portion of the third spool and the first end portion of the first bore in communication with the annular channel of the third spool, and wherein the sliding of the annular channel of the third spool into fluid communication with the cavity places the cavity in venting fluid communication with the first end portion of the first bore.

6. A brake system in accordance with claim 4 wherein the first positioning means includes a service brake valve means and a retard valve means placed in communication by a sixth fluid communication means, the service brake means is further in fluid communication with the source of pressurized fluid and the sump and the retard brake further is in fluid communication with the fifth communication means and the sump.

7. A brake system in accordance with claim 6 wherein the third bore is in fluid communication with the sixth fluid communication means.

8. A brake system in accordance with claim 7 wherein the service brake valve means and the retard valve means includes pressure reducing valves for reducing the pressure in the fifth communication means.

9. A brake system in accordance with claim 8 wherein the service brake valve means and the retard valve means include infinitely variable pressure reducing valves.

10. A brake system in accordance with claim 8 wherein the sixth communication means includes a park brake valve means, the third bore communicating with the sixth communication means between the park brake valve means and the retard brake valve means, wherein the park brake valve means is selectively positionable between a first position wherein the service brake valve means is in fluid communication with the retard brake valve means and a second position wherein the retard valve means and the third bore are in fluid communication with the sump.

11. A brake system in accordance with claim 2 wherein the cross-sectioned area of the first spool is greater than the cross-sectioned area of the third spool.

12. A brake system in accordance with claim 1 wherein the first and second spools are resiliently disposed in the first and second bores respectively, the first spool defining a first annular channel in fluid communication with the first bore, the first spool further defining a first channel means for placing the first annular channel in fluid communication with an end of the first spool, the second spool defining a second annular channel in fluid communication with the second bore, the second spool further defining a second channel means for placing the second annular channel in fluid communication with an end of the second spool, the first annular channel positionable to provide communication selectively between the pressurized fluid source and the first set of brakes and between the sump and the first set of brakes, and the second annular channel positionable to provide communication selectively between the pressurized fluid source and the second set of brakes and between the sump and the second set of brakes.

13. A brake system in accordance with claim 12 wherein the first channel means includes an orifice and the second channel means includes an orifice.

14. A brake system in accordance with claim 12 wherein the first spool defines at least one modulating slot communicating with the first annular channel and with the first bore, the modulating slot orientated with respect to the first annular channel so as to come into fluid communication with the sump prior to the first annular channel;

wherein the second spool defines at least one modulating slot communicating with the second annular channel and with the second bore, the modulating slot orientated with respect to the second annular channel so as to come into fluid communication with the sump prior to the second annular channel;

the modulating slots of the first and the second spools for modulating the fluid pressure to the first and second set of brakes, respectively, by venting fluid to the sump should the fluid pressure in the first set and second set of brakes, respectively, become too high.

15. A brake system in accordance with claim 12 wherein the first bore is closed at an end adjacent to the end of the first spool with which the first channel means of the first spool communicates, the brake system including a first spring means positioned between the closed end of the first bore and the said end of the first spool, the first spring means for urging the first spool away from the closed end of the first bore and the first annular channel out of communication with the source of fluid, wherein fluid is provided between the closed end of the first bore and the first spool by the first channel means for also urging the first spool away from the closed end and the first annular channel out of fluid communication with the pressurized fluid source; and wherein the second bore is closed at an end adjacent to the end of the second spool with which the second channel means of the second spool communication, the brake system including a second spring means positioned between the closed end of the second bore and the said end of the second spool, the second spring means for urging the second spool away from the closed end of the second bore and the second annular channel out of communication with the source of pressurized fluid, wherein fluid is provided between the closed end of the second bore and the second spool by the second channel means for also urging the second spool away from the closed end of the second bore and the second annular channel out of fluid communication with the pressurized fluid source.

16. A brake system in accordance with claim 15 wherein an end of the first and second bores located distally from the first and second spring means are in fluid communication and the first positioning means including fifth fluid communication for placing the distal ends of the first and second bores in fluid communication with the source fluid.

17. A brake system in accordance with claim 16 wherein the first positioning means includes valve means for venting the fifth fluid communication means to the sump for fluid.

18. A brake system in accordance with claim 17 wherein the second positioning means includes a third spool slidably disposed in a third bore defined by the valve body, the third spool communicable with the first spool.

19. A brake system in accordance with claim 18 wherein the third spool is spring biased toward the first spool.

20. A brake system in accordance with claim 19 wherein an end portion of the third bore and an end portion of the third spool located distally from the first spool define a cavity, which cavity is in fluid communication with the first positioning means.

21. A brake system in accordance with claim 20 wherein the first and second sets of brakes include spring-applied and pressure-release brakes and wherein the first set of brakes are the rear brakes, located in a follower unit of the vehicle and the second set of brakes are the front brakes, located in a leader unit of the vehicle.

22. A valve including:

a valve body;
a first spool slidingly disposed in a first bore defined by the valve body;
a second spool slidingly disposed in a second bore defined by the valve body;
positioning means for positioning the first spool, which positioning means is in communication with a portion of the first spool;
a fluid charging port defined by the valve body in fluid communication with the first and second bores and a fluid discharging port defined by the valve body in fluid communication with the first and second bores;
a first communication port defined by the valve body and in fluid communication with the first bore;
a second communication port defined by the valve body and in fluid communication with the second bore;
a first fluid pilot port defined by the valve body and in fluid communication with the positioning means, the positioning means interposed between the first spool and the first fluid pilot port; and
wherein the first bore includes a first end portion which is in fluid communication with a first end portion of the second bore, and wherein the first spool can communicate with the positioning means adjacent the first end portion of the first bore.

23. A valve in accordance with claim 22 wherein the positioning means includes a third spool slidably disposed in a third bore defined by the valve body and wherein a portion of the third bore communicates with the first fluid pilot port.

24. A valve in accordance with claim 22 wherein the valve body defines a second fluid pilot port in fluid communication with the first end portions of the first and second bores.

25. A valve in accordance with claim 23 wherein the first and second spools are spring biased toward the first end portions of the first and second bores, respectively, and the third spool is spring biased toward the first spool.

26. A valve in accordance with claim 22 wherein the first spool defines an annular channel in fluid communication with the first bore and the second spool defines an annular channel in fluid communication with the second bore.

27. A valve in accordance with claim 26 wherein the first spool defines first channel means for placing the first annular channel in fluid communication with a second end of the first spool and wherein the second spool defines second channel means for placing the second annular channel in fluid communication with a second end of the second spool.

28. A valve in accordance with claim 26 wherein the first annular channel provides communication selectively between the fluid charging port and the first communication port and between the first communication port and the fluid discharging port as the first spool slides in the first bore; and wherein the second annular channel provides communication selectively between the fluid charging port and the second communication port and between the second communication port and the fluid discharging port as the second spool slides in the second bore.

29. A valve in accordance with claim 26 wherein the first spool defines at least a first modulating slot which is in fluid communication with the first annular channel and the first bore, the first modulating slot slidable into fluid communication with the fluid discharging port prior to the sliding of the first annular channel into communication with the fluid discharging port; and wherein the second spool defines at least a second modulating slot which is in fluid communication with the second annular channel and the second bore, the second modulating slot slidable into fluid communication with the fluid discharging port prior to the sliding of the second annular channel into communication with the fluid discharging port.

30. A valve in accordance with claim 23 wherein the first spool includes a first end portion and the third spool includes a first end portion communicable with the first end portion of the first spool, and wherein the first and third spools have substantially colinear axes.

31. A valve in accordance with claim 23 wherein the cross-sectional area of the first end portion of the first spool is greater than the cross-sectional are of the first end portion of the third spool.

32. A valve in accordance with claim 23 wherein the first fluid pilot port includes an enlarged portion capable of receiving an end portion of the third spool as the third spool is slid through the third bore toward the first fluid pilot port;

wherein the third spool defines a third annular channel in fluid communication with the third bore and slidable into fluid communication with the enlarged portion of the first fluid pilot port;

wherein the third spool is communicable with the first spool; and wherein the third spool defines third channel means for providing fluid communication between the third annular channel and the portion of the third spool communicable with the first spool.

33. A valve in accordance with claim 27 wherein the first channel means of the first spool includes a first orifice and the second channel means of the second spool a second orifice.

* * * * *